(12) United States Patent
Sasaki et al.

(10) Patent No.: US 6,207,081 B1
(45) Date of Patent: Mar. 27, 2001

(54) METHOD FOR PRODUCING CONDUCTIVE COMPOSITION AND CONDUCTIVE COMPOSITION

(75) Inventors: Tsutomu Sasaki; Taketsugu Ogura, both of Yasu-gun (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/463,739

(22) PCT Filed: Jul. 14, 1999

(86) PCT No.: PCT/JP99/03801
§ 371 Date: Jan. 27, 2000
§ 102(e) Date: Jan. 27, 2000

(87) PCT Pub. No.: WO00/04559
PCT Pub. Date: Jan. 27, 2000

(30) Foreign Application Priority Data

Jul. 17, 1998 (JP) .................................................. 10-203820

(51) Int. Cl.[7] .................................................. H01B 1/22
(52) U.S. Cl. .................... 252/512; 252/513; 252/514; 148/513; 148/DIG. 14
(58) Field of Search .................... 148/513, DIG. 14; 75/255; 252/512, 513, 514

(56) References Cited

U.S. PATENT DOCUMENTS 4,734,319    3/1988   Doi et al. .
5,250,255  * 10/1993  Sagawa et al. ........................ 419/39
5,682,288  * 10/1997  Wani ..................................... 361/502
6,030,553  *  2/2000  Huang et al. ....................... 252/520.3

FOREIGN PATENT DOCUMENTS 10-77416    3/1998   (JP) .

OTHER PUBLICATIONS

Patents Abstracts of Japan, vol. 1995, No. 08; Sep. 29, 1995 & JP 07 114922 A (The Furukawa Battery Co. Ltd.), May 2, 1995; Abstract.

* cited by examiner

Primary Examiner—Daniel J. Jenkins
(74) Attorney, Agent, or Firm—Ostrolenk, Faber, Gerb & Soffen, LLP

(57) ABSTRACT

The present invention provides a process for producing an electrically conductive composition, such as an electrically conductive coating material, which is suitable for forming an electrode of an electronic element, in which the conductive powder is disintegrated into primary particles or near-primary particles and is satisfactorily dispersed in the composition. The conductive powder is disintegrated into primary particles or near-primary particles and is satisfactorily dispersed by either one of the following: a slurry containing an electrically conductive powder is pressurized and passed in branch flow paths 17 and 18 and the branch flows are unified at a collision chamber 19; a single flow of slurry is caused to hit a collision wall; or the slurry is caused to pass through a narrow conduit rapidly so that the conductive powder undergoes a shear force.

17 Claims, 4 Drawing Sheets

5 b

METHOD FOR PRODUCING CONDUCTIVE COMPOSITION AND CONDUCTIVE COMPOSITION

TECHNICAL FIELD

The present invention relates to a process for producing an electrically conductive composition, and to an electrically conductive composition obtained thereby. More particularly, the invention relates to a process for producing an electrically conductive composition, which process is characterized by its treatment method for an electrically conductive powder contained in the conductive composition, and to an electrically conductive composition obtained thereby.

BACKGROUND ART

One of the conductive compositions of interest in the present invention is an electrically conductive coating material. Such an electrically conductive coating material is used for forming an electrode of an electronic element such as a monolithic ceramic capacitor. The electrically conductive coating material employed for such use contains an electrically conductive component comprising a powder of metal such as silver, copper, nickel, or palladium, which component is dispersed in a vehicle containing a solvent, a binder, and other components.

In the above-mentioned conductive coating material, the metal powder must be contained in a sufficiently dispersed state, and when the composition is applied onto an object to form a coating film, the resultant coating film must have a smooth surface with the metal being highly packed. If the metal powder is poorly dispersed, when an internal electrode of a monolithic ceramic capacitor, for example, is formed by use of the conductive coating material, the target capacitance decreases and values thereof are dispersed, and the equivalent series resistance increases disadvantageously.

When a metal powder assumes the form of a micropowder, such a powder typically forms aggregates. Therefore, in order to produce an electrically conductive coating material, the metal powder must be disintegrated to thereby be sufficiently dispersed in a vehicle.

In order to attain the above-mentioned requirements, an electrically conductive coating material is typically produced through the steps of kneading a metal powder and a vehicle containing a solvent, a binder, and other components by use of a kneader or a mixer and dispersing the metal powder in the vehicle by use of a three-roll mill or the like.

However, when the metal powder has a particle size of submicron order or smaller or the metal powder aggregates tightly, disintegrating the aggregated metal powder to a sufficient level through the above-described method so as to thoroughly disperse the powder in a vehicle is difficult. Therefore, in an electronic element having electrodes formed by use of such an electrically conductive composition, satisfactory characteristics are difficult to obtain.

In an alternative method, an electrically conductive coating material is produced through dispersing a metal powder in a vehicle by use of a mill employing a medium, such as a ball mill or a sand mill, instead of a three-roll mill or a like apparatus.

However, when the metal powder is dispersed through the above-described method, the metal powder collides with the medium to form an oblate spherical powder. When an electrically conductive coating material containing such an oblate spherical powder is used for forming an internal electrode of an element such as a monolithic ceramic capacitor, the oblate spherical powder serves as an unfavorable material in the coating film, to thereby adversely affect the reliability of the element; for example, the oblate spherical powder causes interlayer short circuits.

As described above, in a conventional process, disintegrating a metal powder to primary particles or nearly primary particles and sufficiently dispersing the powder in a vehicle has been difficult. Thus, an electronic element having an electrode formed by use of an electrically conductive coating material or an electrically conductive composition does not possess sufficient electric characteristics.

In view of the foregoing, the present invention provides a process for producing an electrically conductive composition which can solve the above-described problems, as well as an electrically conductive composition obtained through the process.

DISCLOSURE OF THE INVENTION

In order to solve the above-described problems, the process for producing an electrically conductive composition according to the present invention is characterized by comprising a first step of providing a slurry containing an electrically conductive powder and a second step of disintegrating and dispersing the conductive powder by either causing collision of the powder or applying a shear force to the powder, or both, the slurry being in a pressurized state.

In order to carry out the above-described second step, there is typically employed a first method in which two flows of slurry are cause to collide with each other from at least two directions; or a second method in which a single flow of slurry is caused to hit a wall; or a third method in which slurry is caused to flow at a high rate in a narrow conduit.

When the first method is employed, slurry is preferably split into a plurality of flow paths and subsequently unified again, collision among flows of slurry being carried out at the time of intermingling.

In the present invention, a powder formed of at least one metal selected from among silver, copper, nickel, and palladium is advantageously used as an electrically conductive powder.

Preferably, the electrically conductive powder employed in the present invention has an average particle size of 1 μm or less as determined under an electron microscope.

In the second step, the slurry is preferably pressurized at 300 kg/cm$^2$ or more.

An additive which enhances dispersibility of the conductive powder may optionally be incorporated into the slurry before the second step.

A binder which imparts viscosity to the slurry may optionally be incorporated before the second step.

Alternatively, the binder which imparts viscosity to the slurry may be incorporated after the second step.

The electrically conductive powder disintegrated and dispersed in the second step may optionally be collected, and a vehicle may be added to the thus-collected powder to thereby produce a coating material such as an electrically conductive coating material.

The present invention is also directed to an electrically conductive composition produced through any one of the above-described production processes.

When any of the above-described processes for producing an electrically conductive composition according to the present invention is used, since a slurry containing an electrically conductive powder is pressurized and the pressure causes collision of the conductive powder to thereby disintegrate and disperse the powder, the conductive powder can be disintegrated into primary particles or near-primary particles and sufficiently dispersed in the slurry without formation of a powder of oblate spherical particles.

Therefore, when an electrically conductive composition such as an electrically conductive coating material containing the thus-treated conductive powder is used for forming an electrode of an electronic element, the non-defective ratio of finished products and reliability of the electronic element can be enhanced. As a result, product yield is increased.

When the process for producing an electrically conductive composition according to the present invention employs a step in which two slurry flows are caused to collide with each other from at least two directions, a slurry is caused to hit a collision wall, or a shear force is applied to a slurry, an apparatus having a comparatively simple structure can be employed to obtain a dispersion of an electrically conductive powder easily and efficiently.

Particularly, when the former step in which two slurry flows are caused to collide with each other from at least two directions is employed, an electrically conductive powder can be easily dispersed through a simple manner according to which slurry is distributed in a plurality of flow paths and unified again.

The effect of the present invention is most remarkable when the conductive powder has an average particle size of 1 $\mu$m or less—which is not easily attained through a conventional method making use of a three-roll mill—as determined under an electron microscope.

Regarding the pressurization of slurry for dispersing the conductive powder, when a force of 300 kg/cm$^2$ or more is applied for pressurization, the powder contained in the slurry can surely and favorably be disintegrated and dispersed by means of collision.

When an additive which enhances dispersibility of an electrically conductive powder is incorporated into the slurry before a step for dispersing the conductive powder, the dispersibility of the conductive powder during the step is enhanced.

In the meantime, when a binder which imparts viscosity to the slurry is incorporated before a step for dispersing the conductive powder, an electrically conductive composition which can be used, for example, as an electrically conductive coating material is easily produced through dilution with a solvent to adjust viscosity of the composition after the step of at least one of causing collision of the conductive powder or applying a shear force to the powder.

In the case in which a binder for imparting viscosity to the slurry is incorporated before a step for causing collision of the conductive powder so as to make the formed conductive composition suitable as an electrically conductive coating material, if the binder is added after the step of at least one of causing collision of the conductive powder or applying a shear force to the powder, disintegration and dispersion of the conductive powder can be carried out without being affected by the binder. Therefore, when an electrically conductive coating material is produced, the binder can be selected in an amount most suitable for the conductive coating material of interest.

Moreover, when the conductive powder which has been disintegrated and dispersed through at least one of the above means of collision or application of shear force is collected and a vehicle for producing a coating material is added to the collected conductive powder, a slurry can be prepared from components suitable for disintegration and dispersion of the conductive powder, without regard to a component which is incorporated into the conductive coating material of interest.

BEST MODE FOR CARRYING OUT THE INVENTION

Figure 1:
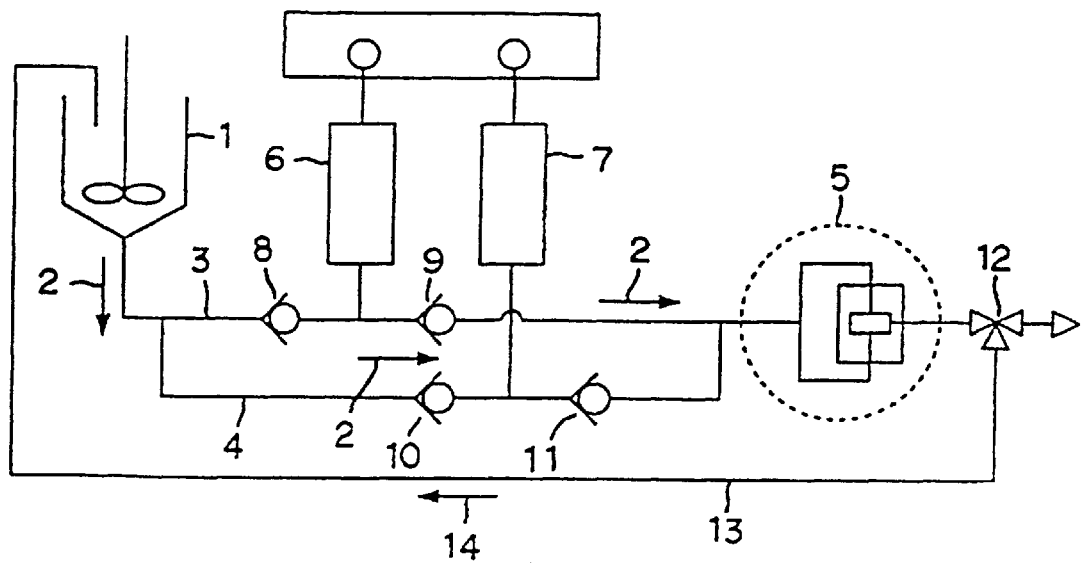
FIG. 1 is a flow chart showing an overall schematic view of an ultra-high-pressure dispersing apparatus which is used for carrying out the process for producing an electrically conductive composition according to one mode of the invention.

Hereafter, the present invention will be described in more detail by way of non-limiting examples of the invention.

In the process for producing an electrically conductive composition according to the present invention, the first step of providing a slurry containing an electrically conductive powder is carried out first. The simplest slurry comprises an electrically conductive powder and a liquid. When the target conductive composition is an electrically conductive coating material, a predominant solvent of the coating material such as a terpene solvent or a glycol solvent may be used as the liquid which forms a slurry of the conductive powder, and other types of solvents such as a ketone solvent, alcoholic solvent, and an aromatic solvent may additionally be used so as to adjust viscosity.

When the target conductive composition is an electrically conductive coating material, in addition to the main solvent of the conductive coating material, a binder which imparts viscosity to the coating material may be added in advance. The binder is appropriately selected in accordance with the conductive coating material to be prepared, and examples include cellulose resins such as methyl cellulose, ethyl cellulose, and nitrocellulose; acrylic resins; alkyd resins; and phenolic resins.

In order to enhance efficiency of disintegration and dispersion of the conductive powder during the second step following the first step, an additive; e.g., a dispersant or a surfactant, which enhances dispersibility of the conductive powder may be incorporated into the slurry in advance. Examples of the dispersant or surfactant used for attaining the above object include anionic, cationic, nonionic, and polymer surfactants. These additives may be appropriately selected in accordance with the species of the conductive powder, or the above-described solvent, binder, and other components.

Typically, mixing proportions of ingredients—dispersant, surfactant, binder, a liquid such as a solvent, and other components—to the conductive powder contained in the slurry are empirically determined in consideration of the efficiency of disintegration and dispersion of the conductive powder during the second step following the first step.

When the target conductive composition is an electrically conductive coating material and an inappropriate solvent or additive is contained in a slurry during preparation thereof, such a solvent or an additive may be removed after completion of the second step. Similarly, when the solvent is contained in an excessive amount, a portion of the solvent may be removed.

A metal powder formed of at least one metal selected from among silver, copper, nickel, palladium, and an alloy thereof that is typically contained in an electrically conductive coating material may be used as an electrically conductive powder contained in the slurry. No particular limitation is imposed on the species of the metal and alloy, and a variety of metals and alloys can be used without any problem.

No particular limitation is imposed on the particle size of the conductive powder so long as the size is typical for an electrically conductive powder contained in an electrically conductive coating material. However, when the conductive powder has an average particle size of 1 μm or less as observed under an electron microscope—which size is not easily attained through a conventional dispersion method making use of, for example, a three-roll mill—the present invention exhibits a particularly advantageous effect.

After completion of the first step of providing a slurry containing an electrically conductive powder, there is carried out the second step of disintegrating and dispersing the conductive powder by at least one of causing collision of the conductive powder or applying a shear force to the powder, the slurry being in a pressurized state. In order to carry out the second step, an apparatus such as an ultra-high-pressure dispersing apparatus is advantageously used.

FIG. 1 is a flow chart showing an overall schematic view of one example of an ultra-high-pressure dispersing apparatus.

As shown in FIG. 1, a slurry containing an electrically conductive powder is reserved in a raw material tank 1. The slurry is fed from the raw material tank 1 to a dispersing portion 5 via two flow paths 3 and 4 in the direction indicated by an arrow 2. In the dispersing portion 5, at least one action of causing collision of the conductive powder or applying a shear force to the powder is effected. The slurry passing through flow paths 3 and 4 is pressurized by pressurizing pumps 6 and 7, respectively. In the flow path 3, check valves 8 and 9 are provided upstream and downstream, respectively, of the point where pressure is applied from the pressurizing pump 6. Similarly, in the flow path 4, check valves 10 and 11 are provided upstream and downstream, respectively, of the point where the pressure is applied from the pressurizing pump 7.

A three-way valve 12 is disposed downstream of the dispersing portion 5. The three-way valve 12 enables the slurry treated in dispersing portion 5 to be fed out, or to be restored to the raw material tank 1 via a backflow path 13 in the direction indicated by an arrow 14. When the slurry is fed in the backflow path 13, a circular path passing through the dispersing portion 5 is formed, and the slurry can be treated in the dispersing portion 5 at desired times.

Figure 2:
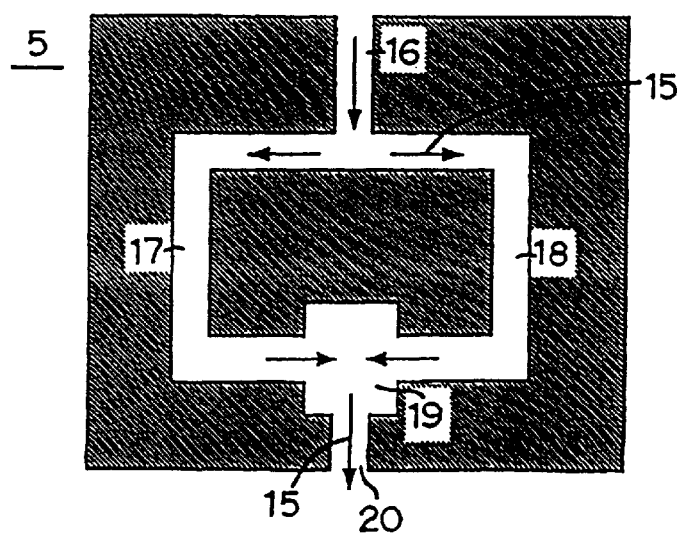
FIG. 2 is an illustrative cross-sectional view showing the sketch of the interior of the dispersing portion 5 shown in FIG. 1.

FIG. 2 is an illustrative cross-sectional view showing the sketch of the interior of the dispersing portion 5 shown in FIG. 1.

Within the dispersing portion 5, the slurry introduced into the dispersing portion 5 is fed in the directions indicated by arrows 15. Specifically, the slurry is fed from an inlet flow path 16, passed in branch flow paths 17 and 18, and intermingled in a collision chamber 19. Subsequently, the slurry is discharged from an outlet flow path 20. In such a flow of the slurry, the slurry is pressurized by pressurizing pumps 6 and 7, and the two slurry flows collide with each other in the collision chamber 19. The collision provides a considerably strong effect on an electrically conductive powder contained in the slurry. Moreover, since the slurry is strongly pressurized by the pump, a strong shear force is applied onto the slurry flowing rapidly through flow paths 16, 17, and 18. Consequently, the conductive powder is sufficiently disintegrated and dispersed.

Figure 3:
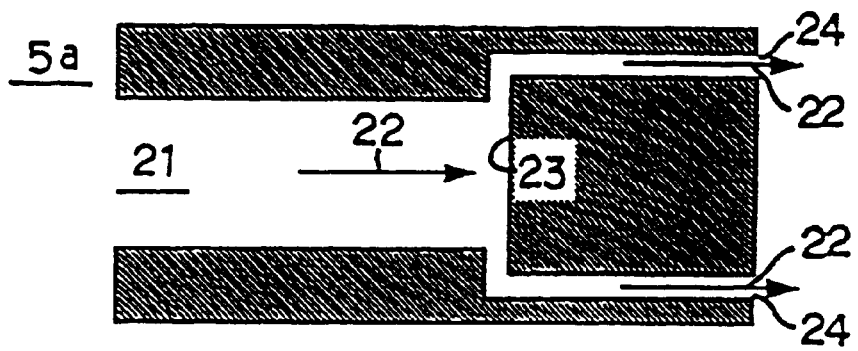
FIG. 3 is an illustrative cross-sectional view showing a sketch of the interior of the dispersing portion 5a built in an ultra-high-pressure dispersing apparatus used for carrying out the process for producing an electrically conductive composition according to another mode of the invention.
Figure 4:
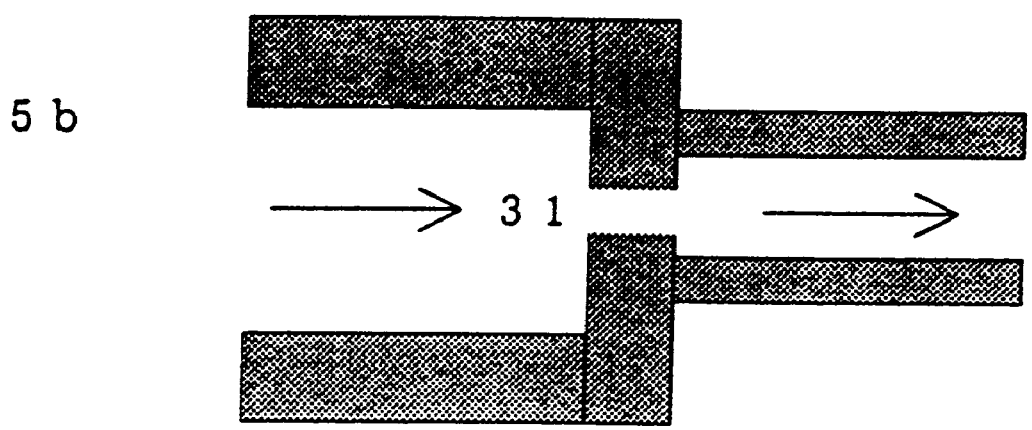
FIG. 4 is an illustrative cross-sectional view showing a sketch of the interior of the dispersing portion 5b built in an ultra-high-pressure dispersing apparatus used for carrying out the process for producing an electrically conductive composition according to yet another mode of the invention.

FIGS. 3 and 4 shows an alternative dispersing portion.

In a dispersing portion 5a shown in FIG. 3, a slurry fed from an inlet flow path 21 is fed in the direction indicated by an arrow 22. Since a collision wall 23 is disposed at the end of inlet flow path 21, the slurry hits the collision wall 23, and a considerably strong effect is provided to the conductive powder contained in the slurry. Thus, the conductive powder is sufficiently disintegrated and dispersed. Subsequently, the slurry is discharged from an outlet flow path 24. When the outlet flow path 24 is sufficiently narrow and the slurry flows rapidly, a shear force is additionally applied onto the conductive powder. As a result, disintegration of the powder proceeds extensively and an excellent dispersion of the powder can be obtained.

In the dispersing portion 5b in FIG. 4, the slurry introduced from an inlet flow path flows rapidly at a neck portion 31 of the flow path, to thereby generate a high shear field, which promotes dispersion. Thus, the conductive powder is sufficiently disintegrated and well dispersed. Thus, a slurry fed into the dispersing portion 5, 5a, or 5b as shown in FIG. 2, 3 or 4 in a pressurized state is divided and unified in the collision chamber 19, or hits the collision wall 23, or flows rapidly through the paths 16, 17, 24, or 31 to thereby generate a shear force, resulting in provision of the effects of disintegration and dispersion. The slurry is preferably pressurized at 300 kg/cm$^2$ or more. Such a pressure surely and favorably enables disintegration and dispersion of the conductive powder caused by at least one of collision or a shear force.

In this way, after completion of the second step, the conductive powder contained in the slurry is disintegrated into primary particles or near-primary particles, and a sufficiently dispersed conductive composition can be obtained. To provide a shear force, the slurry in the narrow conduit has a flow rate of 100 m/s or more, preferably 150 m/s or more, more preferably 200 m/s or more, in order to ensure disintegration and dispersion of the conductive powder under the shear force. The flow rate in this case corresponds to a maximum shear stress in the conduit of 1000 Pa or more and a maximum shear rate of $10^6$ (1/s) or more.

As described above, when an additive such as a binder is added to the slurry in advance, an electrically conductive composition produced through the second step as such may be used as an electrically conductive coating material. Alternatively, an additive such as a binder may be added to a slurry after completion of the second step, to thereby provide a property required of an electrically conductive coating material, such as viscosity.

The conductive powder which is disintegrated and dispersed in the second step may be collected, and a binder for producing a coating material and a vehicle containing a solvent and other components may be added to the collected conductive powder.

Although the dispersing portion 5 in FIG. 2 has two branch flow paths 17 and 18, three or more branch flow paths may be provided.

In the dispersing portion 5 shown in FIG. 2, a slurry is passed into branch flow paths 17 and 18 and unified again in order to cause two flows of slurry to collide with each other from at least two directions. However, another method may be employed for causing two flows of slurry to collide with each other from at least two directions.

The dispersing portion 5 shown in FIG. 2 and the dispersing portion 5a shown in FIG. 3 may be employed in combination to carry out a treatment for disintegrating and dispersing an electrically conductive powder.

There is no significant difference in effect provided to an electrically conductive powder between the dispersing portion 5 shown in FIG. 2 wherein two flows of slurry are collided with each other from at least two directions and the dispersing portion 5a shown in FIG. 3 wherein a slurry hits the collision wall 23.

EXAMPLE 1

α-Terpineol (45 parts by weight) was added to a commercially available nickel metallic powder having a particle size of 0.5 m (50 parts by weight), to thereby obtain a slurry. Subsequently, the slurry was subjected to high-pressure dispersing treatment by use of an ultra-high-pressure dispersing apparatus at a pressure of 2,500 kg/cm$^2$ and a treatment rate of 3 L/minute. The high-pressure dispersing treatment was performed repeatedly, up to five times.

The particle-size distribution of the powders was measured before and after the above-described high-pressure dispersing treatment. The results of measurement are shown in Table 1.

TABLE 1

| Number of high-pressure dispersing treatment | Particle-size distribution: $D_{50}/\mu m$ | Particle-size distribution: $D_{90}/\mu m$ |
| --- | --- | --- |
| Before high-pressure dispersing treatment | 45.0 | 83.0 |
| 1 | 2.1 | 4.5 |
| 3 | 2.0 | 2.9 |
| 5 | 1.8 | 2.9 |

As is apparent from Table 1, even when the high-pressure dispersing treatment is performed only once, the aggregation structure of the metallic powders is disintegrated, thus improving the particle-size distribution. As is also apparent from Table 1, the greater the number of high-pressure dispersing treatment, the greater the disintegration and dispersion of the metallic powder, and the greater the improvement in particle-size distribution.

Next, to each of slurries which contained respective metallic powders and had undergone high-pressure dispersing treatment was added a vehicle (30 parts by weight) containing a mixture of α-terpineol and ethyl cellulose in a weight ratio of 5:1. Subsequently, the mixture comprising the slurry and the vehicle was kneaded by use of a dispersion mill, to thereby prepare an electrically conductive coating material containing a pigment (40%).

Meanwhile, as a comparative example, α-terpineol (45 parts by weight) and the above-described vehicle (30 parts by weight) were added to a nickel metallic powder which had not been subjected to the high-pressure dispersing treatment according to the present invention (50 parts by weight), and the resultant mixture was kneaded by use of a mixer and dispersed by use of a three-roll mill, to thereby prepare an electrically conductive coating material.

Subsequently, the conductive coating materials of the above-described working example and comparative example were each applied to a glass plate, and the thus-obtained films were subjected to measurement of surface roughness by use of a contact-type surface roughness tester.

The results of measurement are shown in Table 2.

TABLE 2

| | Surface roughness of coating film: $Rz/\mu m$ |
| --- | --- |
| Working Example (treatment: once) | 2.0 |
| Working Example (treatment: three times) | 1.7 |
| Working Example (treatment: five times) | 1.4 |
| Comparative Example | 3.5 |

As is apparent from Table 2, in each of the working examples according to the present invention, the surface roughness of the film is improved as compared with the film of the comparative example. Also, it is understood that the greater the number of high-pressure dispersing treatment, the greater the improvement in surface roughness.

Among the above-prepared conductive coating materials of the examples according to the present invention, the coating material prepared from the slurry subjected to the high-pressure dispersing treatment three times was used for the formation of an inner electrode of a monolithic ceramic capacitor. The capacitor was prepared through the following procedure. An electrically conductive coating material was applied to a reduction-resistant ceramic green sheet having a characteristic described in JIS-B, so as to form a film coating having a thickness of 2.0 μm through screen printing, to thereby form an inner electrode having a pattern of chip size: 3.2 mm×1.6 mm. The thus-obtained ceramic green sheet on which the conductive coating material had been printed was stacked up to 70 layers and pressed by use of a pressing machine, and the thus-obtained laminate was cut to a predetermined size by use of a dicer. Subsequently, the laminate was subjected to a binder-removal treatment under a nitrogen atmosphere and fired under a mildly reducing atmosphere, and an outer electrode containing silver was formed on the laminate by burning, to thereby obtain a chip-type monolithic ceramic capacitor having the target capacitance of about 1 μF equipped with the inner electrode comprising nickel.

Meanwhile, the above-described procedure was repeated, except that the conductive coating material of the above-described comparative example, which had been evaluated for surface roughness, was used for an inner electrode, to thereby prepare a monolithic ceramic capacitor for comparison.

Table 3 shows the variance in capacitance of the above-prepared monolithic ceramic capacitors of the working example and the comparative example when the target capacitance is about 1 μF.

TABLE 3

| | Variance in capacitance: 3CV (%) |
|---|---|
| Working Example (treatment: three times) | 3.9 |
| Comparative Example | 11.8 |

As is apparent from Table 3, the variance in capacitance of the monolithic ceramic capacitor of the working example of the present invention is suppressed as compared with that of the comparative example.

EXAMPLE 2

α-Terpineol (45 parts by weight) was added to a commercially available silver-palladium alloy powder having a particle size of 0.5 μm (50 parts by weight), to thereby obtain a slurry. Subsequently, the slurry was subjected to high-pressure dispersing treatment by use of an ultra- apparatus at a high-pressure dispersing pressure of 2,500 kg/cm² and a treatment rate of 3 L/minute. The high-pressure dispersing treatment was performed five times.

Subsequently, a vehicle of the same type used in Example 1 (30 parts by weight) was added to the above-obtained slurry containing the alloy powders, and the resultant mixture the slurry and the vehicle was kneaded by use of a dispersion mill, to thereby prepare an electrically conductive coating material containing a pigment (40%) of the example.

Meanwhile, as a comparative example, α-terpineol (45 parts by weight) and the above-described vehicle (30 parts by weight) were added to a silver-palladium alloy powder which had not been subjected to the high-pressure dispersing treatment according to the present invention (50 parts by weight), and the mixture was kneaded by use of a mixer and dispersed by use of a three-roll mill, to thereby prepare an electrically conductive coating material.

The films formed from the thus-obtained conductive coating materials of the working example and the comparative example were subjected to measurement of surface roughness in the same manner as in Example 1. The results are shown in Table 4.

TABLE 4

| | Surface roughness of film: Rz/μm |
|---|---|
| Working Example | 1.0 |
| Comparative Example | 2.6 |

As is apparent from Table 4, the surface roughness of the film of the working example according to the present invention is improved as compared with that of the comparative example.

EXAMPLE 3

α-Terpineol (44.5 parts by weight) and a polymer dispersant (Homogenol L-18: product of Kao Corporation) (0.5 parts by weight) were added to a commercially available nickel metallic powder having a particle size of 0.5 μm (50 parts by weight), to thereby obtain a slurry. Subsequently, the slurry was subjected to high-pressure dispersing treatment by use of an ultra-high-pressure dispersing apparatus at a pressure of 2,500 kg/cm² and a treatment rate of 3 L/minute. The high-pressure dispersing treatment was performed up to five times.

The particle-size distribution of the powders was measured before and after the high-pressure dispersing treatment. The results are shown in Table 5.

TABLE 5

| Treatment time | Particle-size distribution: $D_{50}$/μm | Particle-size distribution: $D_{90}$/μm |
|---|---|---|
| Before treatment | 45.0 | 83.0 |
| 1 | 0.9 | 2.0 |
| 3 | 0.9 | 1.8 |
| 5 | 0.7 | 1.4 |

As is apparent from Table 5, even when the above high-pressure dispersing treatment is performed only once, the aggregation structure of the metallic powders is disintegrated, resulting in improvement of the particle-size distribution. Also, it is understood that the greater the number of high-pressure dispersing treatment, the greater the improvement in particle-size distribution.

Next, to each of the slurries which contained the respective metallic powders and which had undergone high-pressure dispersing treatment as described above, a vehicle of the same type used in Example 1 (30 parts by weight) was added, and the resultant mixture was kneaded by use of a dispersion mill, to thereby prepare an electrically conductive coating material containing a pigment (40%).

The surface roughness of the film formed from each of the thus-obtained conductive coating materials was measured in the same manner as in Example 1. The results of measurement are shown in Table 6.

TABLE 6

| | Surface roughness of coating film: Rz/μm |
|---|---|
| Working Example (treatment: once) | 1.8 |
| Working Example (treatment: three times) | 1.4 |
| Working Example (treatment: five times) | 1.3 |

As is apparent from Table 6, the greater the number of high-pressure dispersing treatments, the greater the improvement in surface roughness. In addition, as is apparent from comparison between the above working examples of the present invention and the comparative example shown in Table 2, even when the above-described high-pressure dispersing treatment is performed only once, the surface roughness is improved.

EXAMPLE 4

α-Terpineol (145 parts by weight) and a vehicle of the same type used in Example 1 (30 parts by weight) were added to a commercially available nickel metallic powder having a particle size of 0.5 μm (50 parts by weight), to thereby obtain a slurry. Subsequently, the slurry was subjected to high-pressure dispersing treatment by use of an ultra-high-pressure dispersing apparatus at a pressure of 2,500 kg/cm² and a high-pressure dispersing treatment rate of 3 L/minute. The treatment was performed five times.

Subsequently, 100 parts by weight of α-terpineol was removed from the slurry containing the metallic powders by means of fractionation, to thereby obtain an electrically conductive coating material containing a pigment (40%).

The surface roughness of the film formed from thus-obtained conductive coating material was measured in the same manner as in Example 1, to thereby obtain the value "1.3." As is apparent from comparison between the value and the surface roughness of the comparative example shown in Table 2, the surface roughness of the film formed from the conductive coating film of the example is improved.

EXAMPLE 5

α-Terpineol (45 parts by weight) was added to a commercially available nickel metallic powder having a particle size of 0.5 μm (50 parts by weight), to thereby obtain a slurry. Subsequently, the slurry was subjected to high-pressure dispersing treatment by use of an ultra-high-pressure dispersing apparatus at a pressure of 100 kg/cm$^2$, 300 kg/cm$^2$, or 1,500 kg/cm$^2$ and a treatment rate of 0.3 L/minute. The high-pressure dispersing treatment was performed five times under each of the pressure conditions.

Table 7 shows the particle-size distribution of the powders which had undergone a high-pressure dispersing treatment at any of the three different pressures. The results are shown in Table 7.

TABLE 7

| Treatment pressure: kg/cm$^2$ | Particle-size distribution: $D_{50}$/μm | Particle-size distribution: $D_{90}$/μm |
|---|---|---|
| 100 | 5.3 | 8.3 |
| 300 | 2.3 | 3.8 |
| 1500 | 2.0 | 3.0 |

As is apparent from Table 7, the higher the high-pressure dispersing pressure, the greater the disintegration of the aggregation structure of the metallic powders, and the greater the improvement in particle-size distribution. Particularly, when the pressure is 300 kg/cm$^2$ or higher, an excellent particle-size distribution can be obtained.

To each of the slurries containing the respective metallic powders which had undergone the aforementioned high-pressure dispersing treatment, a vehicle of the same type used in Example 1 (30 parts by weight) was added, and the resultant mixture was kneaded by use of a dispersion mill, to thereby prepare an electrically conductive coating material containing a pigment (40%).

The surface roughness of the film formed from each of the thus-obtained conductive coating materials was measured in the same manner as in Example 1. The results of measurement are shown in Table 8.

TABLE 8

| | Surface roughness of coating film: Rz/μm |
|---|---|
| Working Example (pressure: 100 kg/cm$^2$) | 2.4 |
| Working Example (pressure: 300 kg/cm$^2$) | 2.1 |
| Working Example (pressure: 1,500 kg/cm$^2$) | 1.7 |

As is apparent from Table 8, the higher the pressure, the greater the improvement in surface roughness. In addition, as is apparent from comparison between the working examples of the present invention and the comparative example shown in Table 2, even when the above-described pressure is as low as 100 kg/cm$^2$, the surface roughness is improved by the high-pressure dispersing treatment according to the present invention.

EXAMPLE 6

α-Terpineol (169 parts by weight) and a polymer dispersant (Homogenol L-18: product of Kao Corporation) (1 part by weight) were added to a commercially available nickel metallic powder having a particle size of 50 nm (50 parts by weight), to thereby obtain a slurry. Subsequently, the slurry was subjected to high-pressure dispersing treatment by use of an ultra-high-pressure dispersing apparatus at a pressure of 2,500 kg/cm$^2$ and a treatment rate of 3 L/minute. The treatment was performed ten times.

The particle-size distribution of the powders was measured before and after the above-described high-pressure dispersing treatment. The results are shown in Table 9.

TABLE 9

| Treatment time | Particle-size distribution: $D_{50}$/μm | Particle-size distribution: $D_{90}$/μm |
|---|---|---|
| Before Treatment | 53.0 | 95.0 |
| 10 | 2.2 | 3.0 |

As is apparent from Table 9, when the above-described high-pressure dispersing treatment is performed, the aggregation structure of the metallic powders is disintegrated, thus improving the particle-size distribution.

Subsequently, a vehicle of the same type used in Example 1 (30 parts by weight) was added to the above-obtained slurry containing the metallic powders, and the resultant mixture was kneaded by use of a dispersion mill, to thereby prepare an electrically conductive coating material containing a pigment (20%).

Meanwhile, for comparison, α-terpineol (69 parts by weight), the above-described polymer dispersant (Homogenol L-18) (1 part by weight), and the above-described vehicle (30 parts by weight) were added to a nickel metallic powder which had not been subjected to the high-pressure dispersing treatment according to the present invention (50 parts by weight). Subsequently, the resultant mixture was kneaded by use of a mixer and dispersed by use of a three-roll mill, after which α-terpineol (100 parts by weight) was added to the dispersion, to thereby prepare an electrically conductive coating material.

Subsequently, the films formed from the thus-obtained conductive coating materials of the working example and the comparative example were subjected to measurement of surface roughness in the same manner as in Example 1. The results are shown in Table 10.

TABLE 10

| | Surface roughness of coating film: Rz/μm |
|---|---|
| Working Example | 0.90 |
| Comparative Example | 4.75 |

As is apparent from Table 10, the surface roughness of the film of the example is improved as compared with that of the comparative example.

Figure 5:
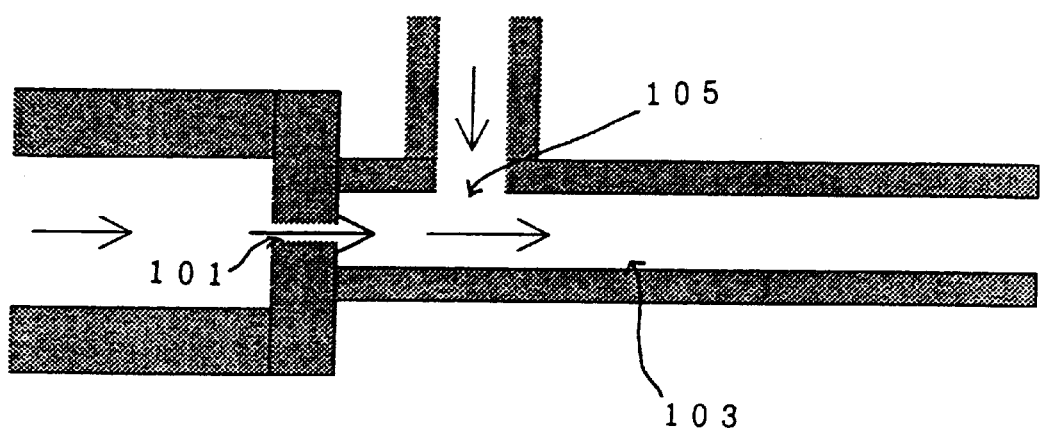
FIG. 5 is an illustrative cross-sectional view showing a sketch of the interior of a dispersing portion built in an ultra-high-pressure dispersing apparatus used for carrying out the process for producing an electrically conductive composition according to yet another mode of the invention, particularly the process described in Example 7.

EXAMPLE 7

α-Terpineol (50 parts by weight) was added to a commercially available nickel metallic powder having a particle size of 0.5 μm (50 parts by weight) to thereby obtain a slurry. Independently, α-terpineol alone was pressurized at 2,500 kg/cm$^2$ by use of a pressurizing pump, and fed through a narrow conduit 101 having a diameter of 0.2 mmφ as shown in FIG. 5. The flow rate of α-terpineol in the conduit was increased to several hundreds m/s or more. Subsequently, α-terpineol was jetted into a conduit 103 having a larger diameter of 1.5 mmφ. When α-terpineol was caused to flow through the conduit rapidly, a negative pressure was generated and under a suction force the slurry was aspired from a slurry supply hole 105 provided in the conduit 103, to thereby mix the slurry with α-terpineol. A shear force was applied to the nickel metallic powder in the slurry due to the high flow rate, and the powder was dispersed. In this case, the mixing ratio of α-terpineol to the slurry was 1:1. The above procedure effectively prevents a pump seal portion from contamination of the metallic powder, and provides a prolonged life of the seal.

Before and after the dispersing treatment, the particle-size distribution of the powders was measured, and the results are shown in Table 11.

TABLE 11

| Repetition of treatment | Particle-size distribution: $D_{50}/\mu m$ | Particle-size distribution: $D_{90}/\mu m$ |
|---|---|---|
| Before treatment | 45.0 | 83.0 |
| Once | 2.5 | 5.7 |
| Twice | 2.2 | 4.5 |

As is apparent from Table 11, the particle-size distribution decreases after the dispersion treatment, and dispersion of the metallic powder is promoted by the treatment. Also, it is understood that the greater the number of treatment, the more extensive the dispersion of the metallic powder.

Subsequently, a vehicle of the same type used in Example 1 (30 parts by weight) was added to the above-treated slurry, and the mixture of the vehicle and the slurry was kneaded by use of a dispersion mill. α-Terpineol was removed from the mixture by fractionation, to thereby obtain an electrically conductive coating material containing a pigment (40%).

The films formed from the thus-obtained conductive coating materials of the working example and the comparative example were subjected to measurement of surface roughness in the same manner as in Example 1. The results are shown in Table 12.

TABLE 12

| | Surface roughness of coating film: $Rz/\mu m$ |
|---|---|
| Working Example (treatment: once) | 2.2 |
| Working Example (treatment: twice) | 1.9 |
| Comparative Example | 3.5 |

As is apparent from Table 12, the surface roughness of the film of the working examples of the invention is improved as compared with that of the comparative example.

Also, comparison among the results of the working examples, it is understood that the surface roughness is further improved when the number of dispersing treatment is increased.

INDUSTRIAL AVAILABILITY

As is described above, the present invention provides an electrically conductive composition used for the formation of an electrode of an electronic element and an advantageous process for producing the composition. According to the present invention, electronic elements of high reliability that pass a quality check can be obtained at an improved ratio, to thereby improve the yield of production.

What is claimed is:

1. A process for producing an electrically conductive composition which comprises a first step of providing a slurry containing an electrically conductive powder and a second step of disintegrating and dispersing the conductive powder by at least one of causing collision of the conductive powder or applying a shear force to the powder, the slurry being in a pressurized state.

2. A process for producing an electrically conductive composition according to claim 1, wherein the second step comprises a step of causing at least two flows of the slurry to collide with each other from at least two directions.

3. A process for producing an electrically conductive composition according to claim 2, wherein the step of causing at least two flows of the slurry to collide with each other from at least two directions comprises a step of splitting the slurry into a plurality of flow paths and reunifying the split flows.

4. A process for producing an electrically conductive composition according to claim 1, wherein the second step comprises a step of causing the slurry to hit a collision wall.

5. A process for producing an electrically conductive composition according to claim 1, wherein the second step comprises a step of providing the powder with a shear force by causing the slurry to flow in a narrow conduit at a flow rate of 100 m/s or more.

6. A process for producing an electrically conductive composition according to claim 1, wherein the conductive powder comprises a powder formed of at least one metal selected from among silver, copper, nickel, and palladium.

7. A process for producing an electrically conductive composition according to claim 1, wherein the electrically conductive powder has an average particle size of 1 $\mu m$ or less as determined under an electron microscope.

8. A process for producing an electrically conductive composition according to claim 1, wherein in the second step, the slurry is pressurized at 300 $kg/cm^2$ or more.

9. A process for producing an electrically conductive composition according to claim 1, further comprising, before the second step, a step of adding to the slurry an additive which enhances dispersibility of the conductive powder.

10. A process for producing an electrically conductive composition according to claim 1, further comprising, before the second step, a step of adding to the slurry a binder which imparts viscosity to the slurry.

11. A process for producing an electrically conductive composition according to claim 1, further comprising, after the second step, a step of adding to the slurry a binder which imparts viscosity to the slurry.

12. A process for producing an electrically conductive composition according to claim 1, further comprising a step of collecting the conductive powder which has been disintegrated and dispersed in the second step, and a step of adding to the thus-collected powder a vehicle for making a coating material.

13. An electrically conductive composition produced through a process as described in claim 1.

14. A process for producing an electrically conductive composition according to claim 2, wherein the conductive powder comprises a powder formed of at least one metal selected from among silver, copper, nickel, and palladium.

15. A process for producing an electrically conductive composition according to claim 3, wherein the conductive powder comprises a powder formed of at least one metal selected from among silver, copper, nickel, and palladium.

16. A process for producing an electrically conductive composition according to claim 4, wherein the conductive powder comprises a powder formed of at least one metal selected from among silver, copper, nickel, and palladium.

17. A process for producing an electrically conductive composition according to claim 5, wherein the conductive powder comprises a powder formed of at least one metal selected from among silver, copper, nickel, and palladium.

* * * * *